Dec. 5, 1967      I. K. DORTORT      3,356,923
SHUNT CONNECTED THYRISTOR FOR CONTROL CIRCUIT
Filed Dec. 24, 1964      4 Sheets-Sheet 1
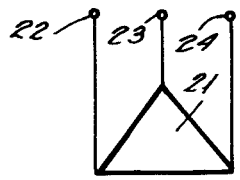
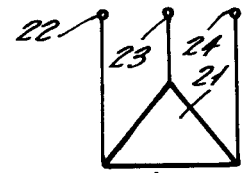
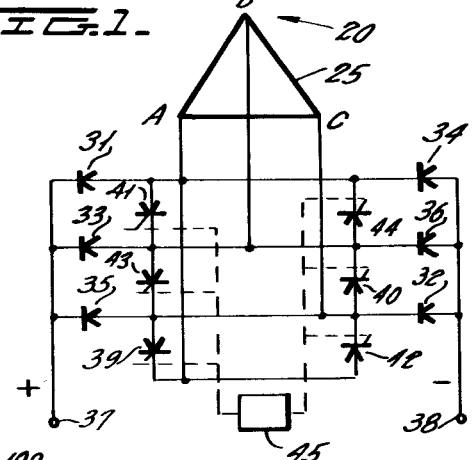
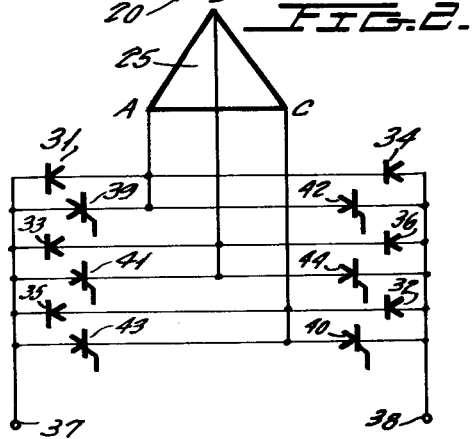
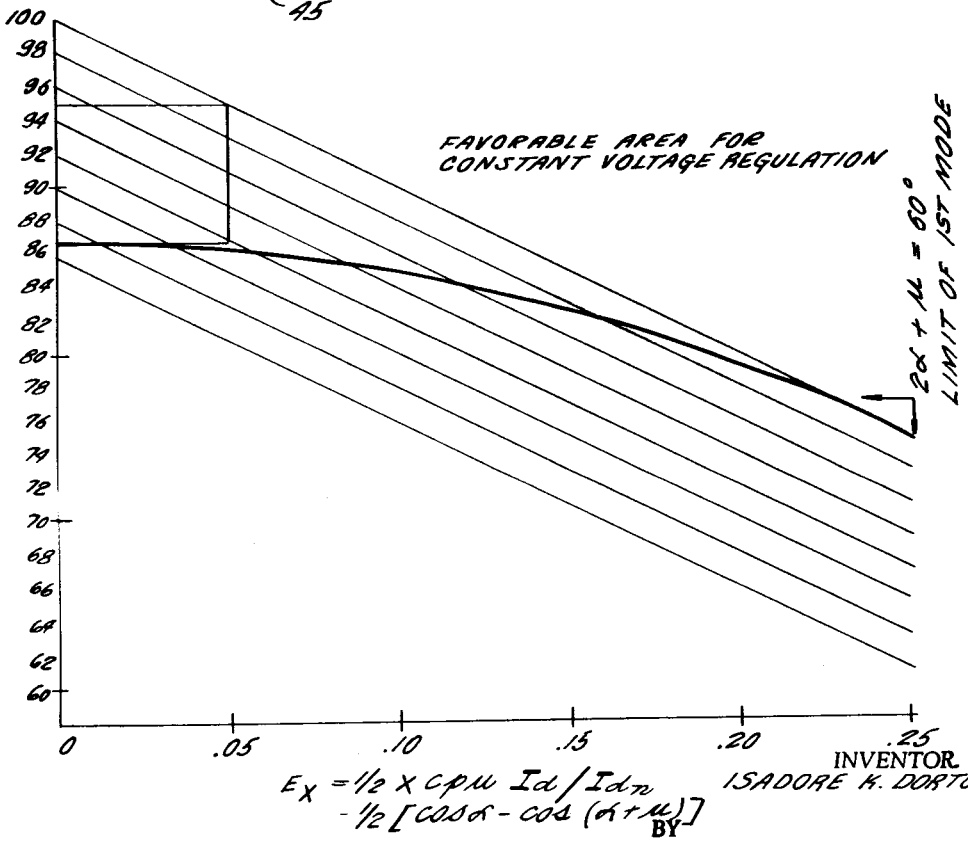
$$E_x = \tfrac{1}{2} \times c\rho u \, I_d / I_{d_n}$$
$$= \tfrac{1}{2} [\cos\alpha - \cos(\alpha + u)]$$
FIG. 4.
INVENTOR.
ISADORE K. DORTORT
BY
OSTROLENK, FABER, GERB & SOFFEN
ATTORNEYS

INVENTOR.
ISADORE K. DORTORT

BY
OSTROLENK, FABER, GERB & SOFFEN
ATTORNEYS

INVENTOR.
ISADORE K. DORTORT
BY
OSTROLENK, FABER, GERB & SOFFEN
ATTORNEYS

Dec. 5, 1967     I. K. DORTORT     3,356,923
SHUNT CONNECTED THYRISTOR FOR CONTROL CIRCUIT
Filed Dec. 24, 1964     4 Sheets-Sheet 4
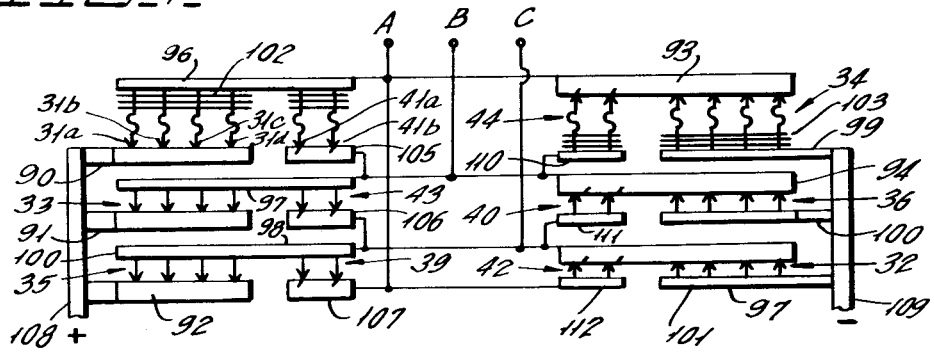
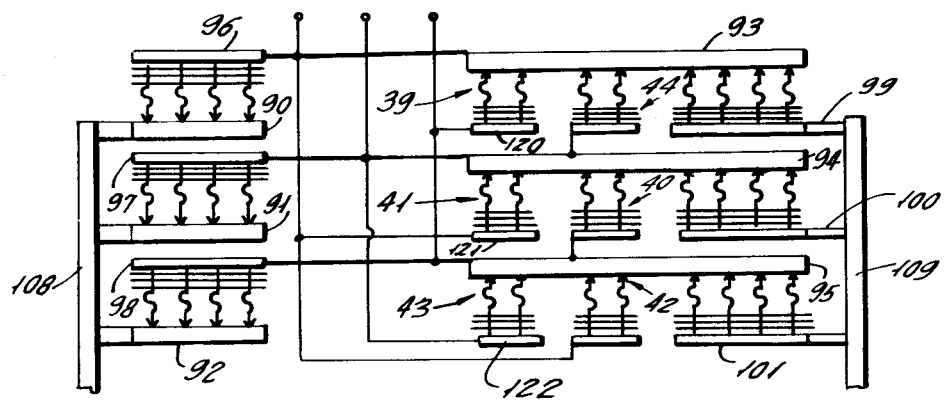
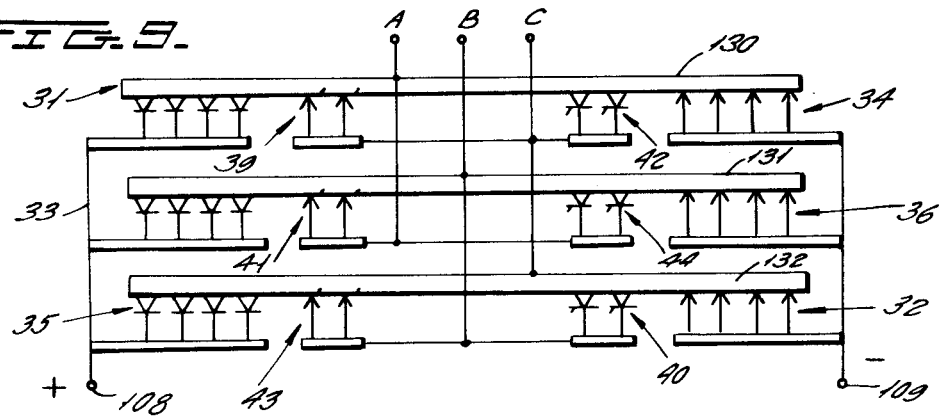
INVENTOR.
ISADORE K. DORTORT
BY
OSTROLENK, FABER, GERB & SOFFEN
ATTORNEYS

# United States Patent Office 3,356,923
Patented Dec. 5, 1967

3,356,923
SHUNT CONNECTED THYRISTOR FOR
CONTROL CIRCUIT
Isadore K. Dortort, Philadelphia, Pa., assignor to I-T-E
Circuit Breaker Company, Philadelphia, Pa., a corporation of Pennsylvania
Filed Dec. 24, 1964, Ser. No. 421,009
5 Claims. (Cl. 321—5)

ABSTRACT OF THE DISCLOSURE

A regulator circuit for high power multiphase rectifiers in which each phase contains normal rectifier elements, with controlled rectifiers connected across each phase and controlled to short circuit each phase for a small period of time just prior to the initiation of forward current conduction through the corresponding rectifier elements of the stage, thereby to obtain small range control of the rectifier output.

This invention relates to a novel regulator or control circuit, and more specifically relates to the shunt connection of thyristor-type devices with normal rectifier devices of a rectifier circuit whereupon small range control is obtained from the control characteristics of the thyristor-type device.

It is common practice to use controlled rectifiers or thyristors as the rectifying element of a rectifier circuit which has adjustable output characteristics. In such applications the thyristors are required to carry full load current and, in the simplest form, full reverse voltage, regardless of the range of control required.

Since thyristors are expensive and not as reliable as diodes, it would be obviously desirable to reduce the number and rating of these thyristors commensurate with the range of control. Thus, it has been recognized that only one or a few thyristors in series with normal diodes will satisfy the reverse voltage applied to the string of elements, assuming, of course, that a sufficient number of thyristors are available to support the required amount of forward voltage prior to the firing of the string for a particular application. Voltage division is accomplished in such instances by suitable voltage dividing resistors. In this application, however, the thyristors must carry the full load current of the circuit.

There are many applications which require fast, accurate voltage control within a relatively small range. Typical cases of such applications are rectifiers supplied with step regulators which have need for fine control between steps; constant voltage rectifiers carrying highly variable loads; and many others which will be apparent to those skilled in the art.

In accordance with the present invention, a limited control range application is provided through a rectifier circuit consisting of normal diodes which further includes thyristor-type devices in shunt connection with the transformer and the respective diodes, whereupon successive phases of the transformer can be short circuited for a predetermined interval immediately prior to normal commutation, thereby reducing voltage across the load during this interval. Since the thyristor will conduct for only a short length of time in this application, the required average current carrying capacity of the thyristor as well as their size and complexity of busing is substantially reduced, at the cost of increased transformer kva. Where, however, the range of regulation required in the system is small, difference between the decreased cost of rectification components and increased transformer cost yields a substantial savings in cost.

Accordingly, a primary object of this invention is to provide a novel regulation system for rectifiers.

Another object of this invention is to provide a novel regulation system for small range control rectifier systems using shunt connected thyristor-type devices.

A further object of this invention is to decrease the net cost of the rectifier components of a rectifier system having a small regulation range.

Still another object of this invention is to simplify the busing of a small control range rectifier system.

These and other objects of this invention will become apparent from the following description when taken in connection with the drawings, in which:

FIGURE 1 schematically illustrates a bridge connected rectifier system incorporating shunt connected thyristors in accordance with the present invention.

FIGURE 2 illustrates a modified circuit similar to FIGURE 1 wherein the shunt connected thyristors are connected thyristors are connected directly across the diodes.

FIGURE 4 is a family of curves showing output voltage for various values of phase control as a function of the reactive voltage drop which is proportional to load current.

FIGURE 7 schematically illustrates the busing structure for a circuit of the type shown in FIGURE 1.

FIGURE 8 illustrates one manner in which the busing of FIGURE 7 can be modified.

Figure 6:
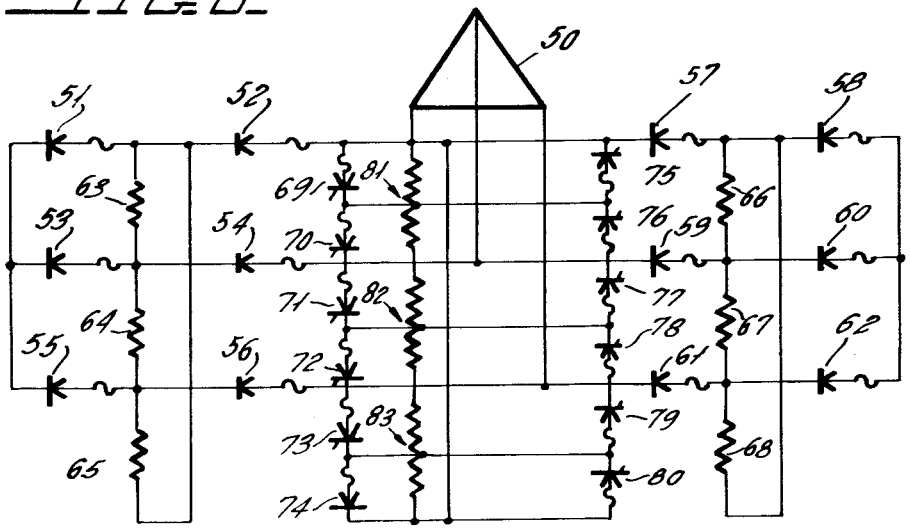
FIGURE 6 illustrates a circuit similar to that of FIGURE 1 for a rectifier system having more than one rectifier element is series in each arm thereof, and more than one thyristor in series.

FIGURE 9 illustrates how the use of both polarities of rectifier devices permits a further modification of the busing of FIGURES 6 and 7 wherein only three heat sink buses are required.

Referring first to FIGURE 1, I have illustrated therein a three-phase full wave bridge connected rectifier system which includes a power transformer 20 having a primary winding 21 which has three terminals 22, 23 and 24 connectable to some suitable source of A-C power. The secondary winding 25 is a delta-connected winding having the phases labeled A, B and C. The phases A, B and C are then connected in the usual manner to diodes 31, 32, 33, 34, 35 and 36 (which are numbered in order of their conduction) which are connected in a suitable manner to positive and negative buses having terminals 37 and 38.

In accordance with the invention, each of the phases of secondary winding 25 is provided with a shunting thyristor-type device such as the devices 39, 40, 41, 42, 43 and 44. Suitable firing circuits illustrated by dotted lines connected to firing control means 45 are then connected to the gate circuits of thyristors 39 through 44 to fire these thyristors in a predetermined sequence indicated by their numeration.

Figure 3A:
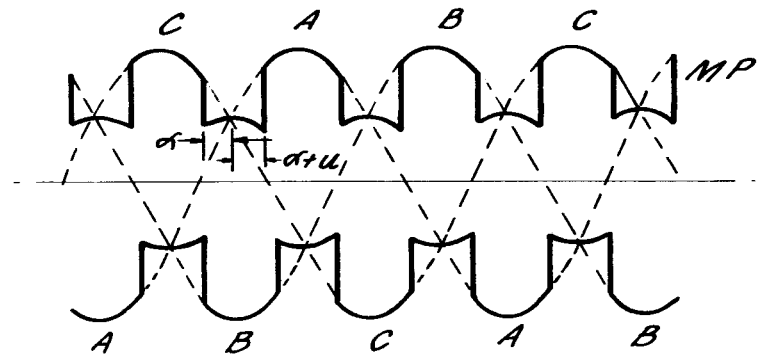
FIGURE 3a illustrates the A-C voltages appearing in the circuits of FIGURE 1 or 2.
Figure 3B:
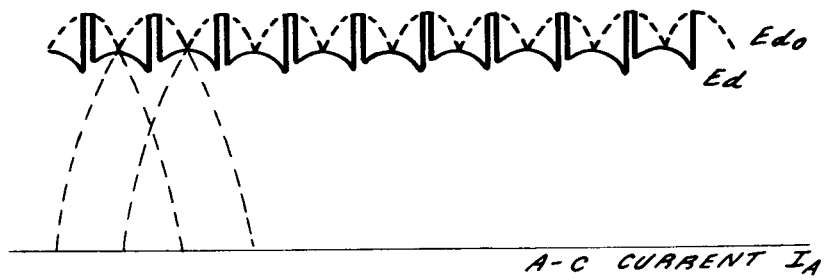
FIGURE 3b illustrates the D-C voltage appearing at the output terminals in the circuit of FIGURES 1 and 2.
Figure 3C:
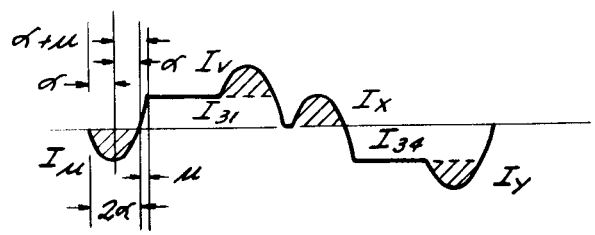
FIGURE 3c illustrates current as a function of time in one of the phases of FIGURE 1 or 2.

The operation of the circuit of FIGURE 1 can be best understood by reference to FIGURES 3a, 3b and 3c. FIGURE 3a shows the phase voltages A, B and C with respect to the virtual neutral in dotted lines, and shows the actual D-C terminal voltages in solid lines, it being understood that the D-C voltages are reduced in the "notched" sections due to the short circuiting effect of the controlled rectifiers or thyristors 39 through 44 as these devices are fired, and by commutation.

More particularly, the thyristor associated with a particular phase is fired at some angle $\alpha$ which precedes the normal period of beginning of commutation of that particular phase with the presently conducting phase. In each case it will be noted that the proper thyristor will be triggered or fired by this short and controlled interval $\alpha$ ahead of the start of normal commutation. The commutation interval $u$ is the commutation interval dependent on phase delay $\alpha$ and load, and until this interval is over, the next phase does not carry its full current. As a result, the output D-C voltage will have the appearance shown in FIGURE 3b wherein the D-C voltage will have the small spikes therein, as illustrated. Note that the curves of FIGURES 3a and 3b illustrate conditions approaching $2\alpha + u = 60°$. When this value of 60° is reached, the spurs on the D-C voltage wave shape of FIGURE 3b will disappear. On the other hand, and where $\alpha$ and $u$ are equal to zero, the D-C voltage will have the form shown in dotted lines in FIGURE 3b which would represent the value $E_{do}$, which is the no-load output voltage. Note that at the value $2\alpha + u = 60°$ the output D-C voltage $E_d$ is approximately equal to $0.866 E_{do}$. This appears to be the economical limit of control by the novel shunting circuit of the present invention, even though greater voltage reduction is still possible. However, when voltage reduction extends beyond the 60° value noted above, the loading of the thyristors and transformer increases rapidly.

While the invention contemplates the use of any type of controllably conductive device, such as a thyristor, it will be apparent to those skilled in the art that pairs of thyristors could be replaced by A-C controlled switches which are another species of controllably conductive devices.

FIGURE 3c illustrates the A-C current $I_A$ flowing out of phase A of transformer 25. Thus, $\alpha$ degrees prior to the time that current would normally flow in diode 31, the thyristor 39 is fired, thereby applying a short circuit between terminals A and C for an interval of $2\alpha$. Thereafter, current begins to flow through diode 31 in a commutation, for a period of $u$ degrees, and continues in a normal manner, it being noted that just prior to the end of this conduction period thyristor 41 is fired, thereby applying a short circuit between phases A and B. Thereafter, phases A and B commutate with one another and, at a later time when current is to begin to flow through diode 33 and just prior to this interval, thyristor 43 short circuits phases B and C so that this portion of the output voltage is removed from the output load until the end of the commutation period between phases B and A. Thereafter, current flows through diode 33 and the current conduction cycle continuously proceeds in this manner. Meanwhile the same process takes place on the negative side of the bridge, with thyristor 40 being fired 60° after 39.

While the novel circuit is illustrated in the foregoing for the case of the circuit of FIGURE 1, it is to be understood that the novel shunting concept can be applied to many different types of circuits including particularly the double Y connected rectifier.

FIGURE 2 illustrates another manner in which the thyristors can be connected in a bridge connected rectifier wherein components similar to those of FIGURE 1 are given similar identifying numerals. Note that the only difference between FIGURES 1 and 2 is that the thyristors 39 through 44 are connected directly in parallel with their respective diodes and with a forward conduction direction which is opposite to that of their respective diodes. However, the characteristics curves of FIGURES 3a, 3b and 3c will be identical for the circuit of FIGURE 2. Clearly, a suitable control circuit is provided for the thyristors of FIGURE 2 which is similar to that of FIGURE 1.

FIGURE 4 shows a family of output voltage curves for various values of phase control plotted against the reactive voltage drop which is proportional to load current. Each of the curves of FIGURE 4 are defined by the equation $$\frac{E_d}{E_{do}} = \cos \alpha - \frac{1}{2} X_{cpu} \cdot \frac{I_d}{I_{dn}}$$

in which $E_{do}$ = theoretical no-load D-C voltage
$E_d$ = D-C output voltage under load, neglecting losses
$I_{dn}$ = rated D-C current
$I_d$ = load current
$X_{cpu}$ = per unit commutating reactance
$\alpha$ = delay angle
$u$ = angle of overlap.

The heavy curved line superimposed on FIGURE 4 defines the limit of $2\alpha + u = 60°$. Operation below this line loses much of the economic advantage of this system.

The rectangular area in the upper left-hand corner of FIGURE 4 is favorable for constant voltage rectifiers. It is drawn for $X_{cpu} = .10$ and allows an A-C voltage variation of about $\pm 4\%$. If the rectangle is narrowed by making $X_{cpu} = 0.7$ it can be made taller to cover A-C voltage variations of approximately $\pm 5\%$.

Figure 5:
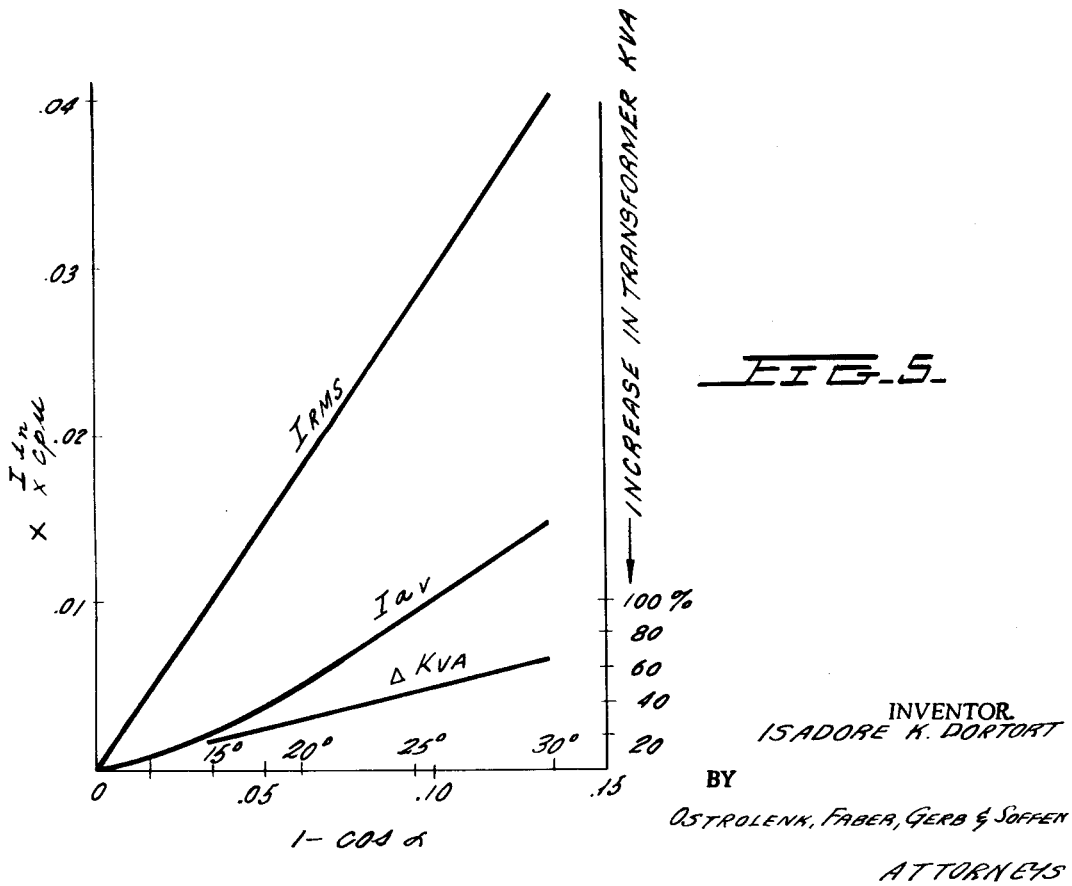
FIGURE 5 shows the average current and RMS current for the thyristors as a function of control angle and additionally shows the increased kva. required of the transformer as a function of control angle.

FIGURE 5 illustrates the RMS current and average current through the thyristors, and the increased kva. required of the transformer for different delay angles used for the thyristors of FIGURES 1 and 2. Thus, for the curve $I_{av}$ the average current through the shunting thyristors in FIGURES 1 and 2 is $$I_{av} = \frac{I_{dn}}{X_{cpu}} \left( \frac{1}{\pi} \sin \alpha - \frac{\alpha°}{180} \cos \alpha \right)$$

At $\alpha = 30°$, $I_{av} = .0147 I_{dn}/X_{cpu}$. Assuming $X_{cpu} = 0.1$, $I_{av} = 0.147 I_{dn}$ or 0.44 times the average diode current.

The RMS current through the thyristors is $$I_{RMS} = \frac{I_{dn}}{X_{cpu}} \sqrt{\frac{\alpha°}{360} \left( 3 - 2 \sin^2 \alpha - \frac{270}{\alpha° \pi} \sin 2\alpha \right)}$$

At $\alpha = 30°$, $I_{RMS} = .0398 I_{dn}/X_{cpu}$. Again assuming $X_{cpu} = 0.1$, $I_{RMS} = 0.398$ or 0.69 times the RMS diode current.

The A-C current also increases with increasing $\alpha$ according to $$I_{ac} = \frac{I_{dn}}{X_{cpu}} \left( \frac{2\alpha°}{180} (1 + 2 \cos^2 \alpha - 2 X_{cpu} \cos \alpha) \frac{3}{\pi} \sin 2\alpha + \frac{4}{\pi} X_{cpu} \sin \alpha + \frac{2}{3} X^2_{cpu} \right)^{1/2}$$

Since $$I_{acn} \text{ (rated)} = \sqrt{\frac{2}{3}} I_{dn}, \quad \frac{I_{ac}}{I_{acn}} = \frac{1.22}{X_{cpu}} \sqrt{f(\alpha, X_{cpu})}$$

This increases the transformer kva. proportionately, as shown in FIGURE 5.

From the foregoing, it is seen that current carrying capability required of the thyristors is decreased significantly below that of the main diodes. However, the voltage capability in both the forward and reverse direction of the thyristors must be similar to that of the diodes in the case of the circuit of FIGURE 1. For the circuit of FIGURE 2, however, the thyristors do not see any reverse voltage, but the forward break-over voltage must be safely higher than the crest-working voltage of the diodes to prevent accidental or premature firing. This increased voltage requirement of the thyristors can be easily accomplished by placing two or more thyristors in series with one another along with suitable voltage dividing means to insure proper voltage division between the series connected elements.

FIGURE 6 illustrates a circuit similar to that of FIGURE 1, except that because of the higher rated output voltage, it requires at least two (or more) series connected diodes.

Referring now to FIGURE 6, I have illustrated therein secondary winding 50 of some suitable power transformer. Each arm of the bridge connected rectifier circuit then includes two series connected cells such as cells 51–52, 53–54, 55–56, 57–58, 59–60 and 61–62. Each of these cells may then be connected in series with a suitable fuse, as indicated.

In order to insure voltage division between series connected diodes, a suitable voltage balancing transformer may be used which includes transformer secondary windings 63, 64, 65, 66, 67 and 68. This voltage balancing transformer can be constructed in accordance with U.S. Patent No. 2,932,781, entitled Semi-Conductor Protective Means, assigned to the assignee of the present application.

Each of the shunting thyristor circuits may then include two series connected thyristors such as thyristors 69–70, 71–72, 73–74, 75–76, 77–78 and 79–80. Once again each of the thyristors 69 through 80 may have its respective current limiting fuse.

The voltage divider transformers then have center-tapped primary winding sections 81, 82 and 83. In order to provide forced voltage division between the series connected pairs of thyristors, the various thyristors are connected directly across respective halves of the center-tapped voltage balancing transformer primary windings 81 through 83, as illustrated. Thus, a substantial savings in other auxiliary voltage balancing means is afforded when the voltage balancing transformer concept is used. Note that if three series connected thyristors were used for each arm in the bridge, the voltage balancing transformer primary winding would be divided into three equal sections.

Note that for the circuit of FIGURE 2, if each arm of the bridge has multiple diodes in series, and the same number of thyristors, the same secondary windings of the voltage divider transformer serve for both the diodes and thyristors, and the tapped primary windings are unnecessary.

As indicated above, the present invention permits simplified busing for the thyristor devices and their respective diodes. As an illustration of this novel simplified busing, FIGURE 7 illustrates a circuit similar to that of FIGURE 1 for the case of four parallel connected diodes in each arm of the bridge. Thus, the diodes 31a, 31b, 31c and 31d correspond to the diode 31 of FIGURE 1. In a similar manner, the diode groups 32 through 36 correspond to the individual diodes 32 through 36 of FIGURE 1. Each of the diodes of each arm then terminate on a respective bus such as the buses 90, 91, 92, 93, 94 and 95, respectively. The other terminal of each of the diodes are then again connected to a common bus conductor such as the buses 96, 97, 98, 99, 100 and 101. Note that suitable current balancing lamination sectors schematically illustrated as iron laminations 102 and 103 in FIGURE 7, could be used to force suitable current division between the four parallel connected diodes, as described in U.S. Patent No. 3,040,232, entitled Method of Removing and Replacing Individual Rectifier Elements and Fuses Under Load, in the name of George A. Healis, and assigned to the assignee of the instant invention. Each of buses 90, 91 and 92 are then connected to a positive output bus 108, while each of buses 99, 100 and 101 are connected to a common negative output bus 109. Phase A is then connected to buses 96 and 93; phase B is connected to buses 97 and 94; and phase C is connected to buses 98 and 95. Additional heat sink buses are then provided such as the heat sinks 105, 106 and 107 which are connected to phases B, C and A, respectively, for the reception of the thyristor devices. Also buses 110, 111, 112 are connected to phase B, C and A, respectively.

Thus, in FIGURE 7, two parallel connected thyristors are used for each arm of the bridge, and, for example, include thyristors 41a and 41b corresponding to thyristor 41 of FIGURE 1. In a similar manner, group 43 represents the thyristor 43 of FIGURE 1; group 39 corresponds to thyristor 39 of FIGURE 1; group 44 corresponds to thyristor 44 of FIGURE 1; group 40 corresponds to thyristor 40 in FIGURE 1; and group 42 corresponds to thyristor 42 of FIGURE 1. In each case the thyristors may have suitable current balancing means associated therewith, and, as schematically illustrated, all of the thyristors and diodes may have respective fuses associated therewith. Each of the thyristor groups 44, 40 and 42, of course, terminate on respective buses 110, 111 and 112, respectively, as shown. They are mounted on heat sinks 93, 94 and 95. Similarly, 41, 43 and 39 are mounted on separate heat sinks 105, 106 and 107, respectively.

FIGURE 8 illustrates a busing system similar to that of FIGURE 7 where, however, the heat sinks 105, 106 and 107 of FIGURE 7 have been incorporated into the common heat sinks 94, 95 and 93 of FIGURE 7, respectively. Thus, in FIGURE 8, where numerals similar to those of FIGURE 7 identify similar components, the thyristor groups 39, 41 and 43 are mounted directly upon the common heat sinks 93, 94 and 95, and have their other terminals terminate upon conductors 120, 121 and 122.

FIGURE 9 shows a still further simplification of the busing for the circuit of FIGURE 1 where only three heat sinks are used. Thus, in FIGURE 9, opposite polarity diodes are used in the positive and negative arms so that the diode groups 31 and 34 terminate on a common bus 130. In a similar manner, opposite polarity diodes 33 and 36 terminate on a common bus 131, while opposite polarity diodes 39 and 32 terminate on the common bus 132.

The respective thyristors for the circuit of FIGURE 9 are also formed of opposite polarity-type devices whereupon the thyristor group 39 and 42 can terminate on the common bus bar 130; the thyristor groups 41 and 44 terminate on the common bus bar 131; while thyristor groups 43 and 40 terminate on the common bus bar 132.

The opposite ends of the various groups of diodes and thyristors are then connected to respective bus conductors which ultimately are connected to the input A-C conductors connected to phases A, B and C.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A control circuit for controlling the transmission of power between an A-C circuit having first and second A-C terminals and a D-C circuit having first and second D-C terminals; a diode having first and second main electrodes connected in series with said first and second A-C terminals and said first and second D-C terminals; said control circuit comprising a controllably conductive means having first and second main electrodes and a control electrode; said first and second main electrodes connected to said first and second A-C terminals respectively of said A-C circuit; said first main electrode of said diode and said first main electrode of said controllably conductive means connected together at a common point; said diode and said controllably conductive means each conducting forward current in oposite directions with respect to said common point; and control circuit means connected to said control electrode rendering said controllably conductive device conductive for forward current conduction therethrough at a time instant preceding the conduction of forward current by said diode; and control means connected to said control circuit means for varying said time of conduction of said controllably conductive means.

2. The device substantially as set forth in claim 1 wherein said controllably conductive means comprises a thyristor.

3. A control circuit for controlling the transmission of power between a multiphase A-C system and a D-C system; said control circuit including a respective diode connected in each phase of said multiphase A-C system and in series with said D-C system, a respective controllably conductive means connected in parallel with each of said phases of said A-C system, and a control circuit means connected to each of said controllably conductive means; one terminal of each of said controllably conductive means connected to one terminal of one of said respective diodes; each of said controllably conductive means connected for conducting main forward current in a direction opposite to the direction of forward current flow through its said respective diode; said control circuit means rendering its said controllably conductive means conductive at a time instant preceding the conduction of forward current by its said respective diode and control means connected to said control circuit means for varying said time instant.

4. The device substantially as set forth in claim 3 wherein each of said controllably conductive means comprise thyristors.

5. In combination; a three-phase A-C transformer; a first and second diode for each of said phases having first and second terminals; said first terminals of said first and secod diodes connected to each of said phases of said transformer with a polarity to conduct during the positive and negative phases respectively of their said respective phase, said second terminals of said first and second diodes being connected to respective positive and negative bus bars, a respective thyristor connected in parallel with each of said diodes, and a control circuit means for rendering said thyristors conductive in their forward current carrying direction; said forward current carrying direction of said thyristors being opposite to the forward current carrying direction of their said respective diodes; said control circuit means rendering said thyristors conductive in their said forward current carrying direction at a time prior to normal forward current conduction by their said respective diode; whereby said transformer is short circuited during the intervals of forward current conduction by said thyristors until forward current conduction by their said respective diodes.

References Cited

UNITED STATES PATENTS

| 3,308,368 | 3/1967 | Schmidt | 321—9 |
| 3,309,623 | 3/1967 | Depenbrock | 331—113 |
| 3,113,259 | 12/1963 | Walker | 321—27 X |
| 3,213,349 | 10/1965 | Gutwiller | 321—11 |

JOHN F. COUCH, *Primary Examiner.*

G. GOLDBERG, *Assistant Examiner.*